106. COMPOSITIONS, COATING OR PLASTIC

79

Cross Reference 1,115,988

Examiner

UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

PLASTIC COMPOSITION FOR SHOE-FILLERS.

1,115,988.     Specification of Letters Patent.     Patented Nov. 3, 1914.

No Drawing. Original application filed May 11, 1908, Serial No. 432,083. Divided and this application filed July 1, 1912. Serial No. 707,017.

106-38

*To all whom it may concern:*

Be it known that I, ANDREW THOMA, a citizen of the United States, and resident of Cambridge, county of Middlesex, State of Massachusetts, have invented an Improvement in Plastic Compositions for Shoe-Fillers, of which the following description is a specification.

My present invention relates to shoe-filling compositions, and this application is a division of my previous application Serial No. 432,083, filed May 11, 1908 now Patent No. 1,032,312 dated July 9, 1912. As disclosed in that application, which is in part, a derivative from my Patent No. 832,002, September 25, 1906, I have found that several materials have qualities which adapt them for use as binders in shoe filling compositions, i. e. compositions used in filling the inner soles of shoes of certain kinds. These compositions are usually composed of cork or ground leather and a suitable binder. Wax tailings, a product of petroleum distillation is such a binder, as stated in that application, is easily responsive to or sensitive to heat and is very well suited to the purpose. In some forms, it has, however, certain objections, i. e. it is too sticky or runny, is too easily absorbed by the cork or other filler-body and is so sticky as to follow the knife of the operator in the act of filling the shoe bottom cavity. It is better, therefore, to introduce with this waxy material or its equivalent, some restraining, slow-drying component. One that I have found very useful for the purpose is dextrin, and the combination of a waxy base of a permanently sticky, tenacious, heat-responsive and quick-setting adhesive with dextrin is the subject of my present invention.

My parent application (now Patent No. 1,032,312 above) explains both the theory and practice of the invention in its broader aspects, in connection with a wide variety of species, and contains the broad or generic claims, and the specific claims to that species which employs starch paste and wax tailings, whereas the present divisional case is limited, as just noted, to that species which employs the vegetable gum or stiffener, dextrin.

Dextrin, sometimes called British gum, is prepared in a great variety of ways, and is offered to the trade by reference to its varying colors, compositions, and consistencies, besides being sometimes named with reference to natural gums which it is made to imitate. It is the base of many adhesives, including mucilage, is generally the adhesive placed on the back of postage stamps, and is also used in sizes. It is very soluble in water and is not easily affected by ordinary conditions of use, though in very dilute solutions it may be. In the present relation no difficulty is observed. I include under this term dextrin treated by any method or means whereby it is rendered readily soluble and mucilaginous.

I thoroughly mix with comminuted filler-body material (such as granulated cork, ground leather, etc.,) dextrin, preferably in a powdered condition and to this I add wax tailings or any of the sticky or other ingredients mentioned for the base of the binder, and then a quantity of water sufficient to have transformed the dextrin into a rather thick jelly, if the dextrin has been used alone, and mix until the whole becomes a plastic, workable dough.

If preferred, instead of applying the dextrin to the cork first as above, the dextrin may be used in solution. The dextrin may be incorporated in any convenient manner such as the several different ways which are described in the prior application 432,083, (Patent 1,032,312), with the gummy, sticky ingredient. The latter, as described in the patents referred to in said application, is readily influenced (or rendered free-flowing) by heat. Therefore, when added to the above solution it makes a free-flowing paste. To this free-flowing paste I add the comminuted filler-body material in sufficient quantity to make a plastic, workable dough or filler proper. This method eliminates the possibility of the body-material (especially if ground leather be used) taking up the penetrative sticky ingredient. Also I may furnish the cementitious binder in a paste-like form to the shoe manufacturer for him to add his own body material. The first described method is primarily for supplying the material complete with the cementing agent latent or inactive,—allowing the water or moisture to be added by the shoe manufacturer just before applying the filler to the shoe-bottom cavity. By adding dextrin and dissolving it as indicated above, I diminish the tendency of the binder to be absorbed, and the body material, though each particle is coated with an adhesive and is firmly united to the other particles of the mass by the binder, is not penetrated by the binder and hence preserves its lightness and resiliency, and since a smaller quantity of the binder is necessary, the expense is also greatly reduced. The composition remains practically unchanged during the life of the shoe. I give no proportions principally because the consistency of the tailings (or other binder) varies so much that a formula would be worthless save for the tailings of one particular source. Gentle heat will facilitate the mixing. The dextrin may first be dissolved in water and the tailings and cork added later, but I prefer to add the dry dextrin to the binder first as it mixes more easily with the binder when dry.

I may supplement the wax tailings by adding or substituting other binders of the kind indicated and referred to in the above patent first mentioned, which include or comprise the vegetable gums, such as gutta percha, balata, pontianac, almadeina, chicle, tuna, the low-grade rubbers, stearin pitch, resins, mineral tar and asphalts, and tarry by-products of petroleum distillation, (treated and modified, according to their character and requirements, as in Patents 832,002 and 855,868). I may supplement the dextrin by adding quantities of one or more of the following or of their equivalents, viz. gluten, vegetable gums, glue, casein, albumen, or soluble silicates. Dextrin or products from starch, are brittle and fragile when set and possess little or no tenacity or toughness. This is modified or eliminated to a great extent by my invention, whereby I provide not only a cohesion by the sticky waxy or gummy ingredient, but I prevent the hardening of the dextrin in mass to an extent which would render it brittle. The sticky, gummy component subdivides the dextrin, and while it permits it to become set by the introduction of moisture, it prevents undue hardness and also maintains it permanently in its set condition when thus once set.

Having described my invention, what I claim as new and desire to secure by Letters Patent is:

1. A compound, comprising dextrin and wax tailings.

2. A compound, comprising dextrin, wax tailings, and comminuted filler-body material for a shoe-filling composition.

3. A filler, comprising dextrin, a sticky ingredient capable of toughening the compound and rendering the dextrin tenacious when set, and comminuted filler-body material.

4. The combination, in a shoe-filling composition, of a permanently sticky, tenacious, slow-drying waxy adhesive and a restraining agent consisting at least in part of dextrin.

5. The combination in a shoe-filling composition, of a permanently sticky, tenacious, slow-drying adhesive, dextrin, moisture, and a comminuted filler-body material.

6. A compound, comprising dextrin, wax tailings, moisture, and comminuted filler-body material.

7. A shoe-filling compound, comprising a binder consisting at least in part of wax tailings, a restraining agent consisting at least in part of dextrin, water, and a filler material, consisting at least in part of ground cork.

8. A shoe-filling compound, comprising a permanently sticky, tenacious binder, dextrin in solution, and a comminuted filler-body material, the materials being so proportioned and mixed that the absorption of the binder into the particles of the filler-body material is substantially eliminated whereby each of said particles retains a core practically free from the absorbable binder, said core having its natural resiliency and strength unmodified.

9. A shoe-filler compound, comprising dextrin, comminuted filler-body material, and means for maintaining said dextrin permanently in its set condition when once set, as in a shoe bottom.

In testimony whereof, I have signed my name to this specification, in the presence of two subscribing witnesses.

ANDREW THOMA.

Witnesses:
GEO. H. MAXWELL,
WALLACE A. SHIPTON.